US006574792B1

(12) United States Patent
Easton

(10) Patent No.: US 6,574,792 B1
(45) Date of Patent: Jun. 3, 2003

(54) DYNAMICALLY GENERATING EXPANDED USER MESSAGES IN A COMPUTER SYSTEM

(75) Inventor: John Paul Easton, Basing (GB)

(73) Assignee: International Business Machines Corporation, Armonk, NY (US)

(*) Notice: Subject to any disclaimer, the term of this patent is extended or adjusted under 35 U.S.C. 154(b) by 463 days.

(21) Appl. No.: 09/584,202

(22) Filed: May 31, 2000

(30) Foreign Application Priority Data

Mar. 22, 2000 (GB) .............................. 0006763

(51) Int. Cl.[7] .............................................. G06F 9/45
(52) U.S. Cl. ...................... 717/142; 717/141; 717/142; 717/143; 717/133; 717/157; 704/9
(58) Field of Search ................ 717/142, 143, 717/133, 157, 141

(56) References Cited

U.S. PATENT DOCUMENTS

| | | | | |
|---|---|---|---|---|
| 4,860,203 A | * | 8/1989 | Corrigan et al. ............ | 717/143 |
| 4,931,928 A | | 6/1990 | Greenfeld | |
| 5,117,497 A | * | 5/1992 | Kanamori et al. ............ | 704/9 |
| 5,121,475 A | | 6/1992 | Child et al. .................. | 707/507 |
| 5,297,040 A | * | 3/1994 | Hu .............................. | 707/102 |
| 5,452,206 A | * | 9/1995 | Turrietta et al. .............. | 714/37 |
| 5,452,449 A | * | 9/1995 | Baldwin et al. ............. | 707/531 |
| 5,463,768 A | * | 10/1995 | Cuddihy et al. .............. | 714/37 |
| 5,500,881 A | * | 3/1996 | Levin et al. ................. | 717/141 |
| 5,845,120 A | | 12/1998 | Reddy et al. | |
| 6,338,034 B1 | * | 1/2002 | Ishikawa et al. ............. | 704/9 |

FOREIGN PATENT DOCUMENTS

EP  0261845  11/1987 ............. G06F/9/44

OTHER PUBLICATIONS

"FreeBSD System Manager's Manual: syslogd manual page", Oct. 12, 1995, "The FreeBSD Documentation Project" (http://www.freebsd.org/docproj/doc-set.html), "The manual pages", p. 1.*

Kramer, Doug; "How to Write Doc Comments for Javadoc", Jan. 17, 1999, Sun Microsystems, JDK v1.1 Tool Reference Pages, "The Wayback Machine" (http://www.archive.org/web/*/http://java.sun.com), pp. 3 and 8 ("The General Form" and "Tag Comments: @param").*

ISOCOR—Isoplex Accounting Option User Guide—Copyright 1995, 13 pages.

* cited by examiner

*Primary Examiner*—Anil Khatri
*Assistant Examiner*—David A Snyder
(74) *Attorney, Agent, or Firm*—Edward H. Duffield

(57) ABSTRACT

Dynamically generating expanded user messages, in a computer system having a logging tool for creating a log file. The log file comprises log messages produced in response to events occurring during execution of an application program. Firstly, the application program source code is preanalysed to extract a plurality of program components, including comments. The different component types and comments associated with them are ordered into tabular form. An individual log message is read from the log file and its program components are determined. Comments associated with these program components are read from the relationship tables. The comments are used to supplement the original log message by combining them to produce expanded user messages in a user-friendly format. These expanded user messages may be further grammatically parsed into natural language, in order to provide the end user with more meaningful diagnostic information.

14 Claims, 5 Drawing Sheets

DYNAMICALLY GENERATING EXPANDED USER MESSAGES IN A COMPUTER SYSTEM

FIELD OF THE INVENTION

The present invention relates the dynamic generation of expanded user messages in a computer system.

BACKGROUND OF THE INVENTION

In order to assist developers of computer programs or service personnel to determine the cause of a problem or the reason for unexpected behaviour of a computer system, it is known to generate and store diagnostic information for subsequent analysis. Such diagnostic information typically consists of messages produced in response to events occurring within the computer system.

These events, which are defined as changes occurring within the system, usually trigger messages, which may report on successful events, or, more typically report to the end user that an unsuccessful event, that is, an error, has occurred. The messages contain information as to why the error has occurred and on how the error can be resolved. The messages can assist the developer of the code or a service organisation in problem analysis and may typically include components such as the following:

```
<timestamp> <message_identifier> <function_name>
<variables> <text message> <return code>
```

The messages may be written to log files by applications or other operating system programs. These log files provide a history of the events that have occurred, including when the events occurred and causes of the events. The files can be queried to obtain a visual output of the messages or may automatically display the messages to the end user. A typical log file may be the record of system messages to and responses from a systems operator.

Also known are "trace" files, which are usually produced when the sequence of events during execution of a computer program is tracked. The results of the tracing operation are stored in trace files, which may also be displayed for perusal. The term "log file" as henceforth referred to, also includes trace files.

However, as can be seen from the above message format, the diagnostic information displayed is often cryptic, unintuitive and may contain inadequate information as to possible cause and suggested solutions. Also, the interpretation or analysis of these messages in log files is potentially complex and prone to error.

U.S. Pat. No. 5,121,475, issued Jun. 9, 1992 to Garry Child et al, describes a method of dynamically generating more user-friendly messages by lookup in a message table of a pre-existing message matching an error log request and the modification of the pre-existing message by data included in the request. The source of the user-friendly message text, however, is not described.

Other approaches to the analysis and presentation of diagnostic information are also known in the art. For example, Abend-Aid XLS from Compuware Corporation provides diagnostic reports alongside source code listings.

Another source of information about the program itself, including a failing portion, is in the form of comments in the program source code. These may contain a great deal more detail than is typically available from error messages. Comments are available to both developers and service organisations as a tool for problem analysis. However, the inspection of comments has to occur manually, since the original source code must be viewed. This is laborious and requires a detailed understanding of the program source code.

SUMMARY OF THE INVENTION

Thus, there is a need for user messages to provide sufficient and accurate information to the end user, without requiring the program source code to be examined or displayed. There is also a need for the user messages to be displayed in a user-friendly format, which may be derived automatically.

Accordingly, the present invention provides a method for dynamically generating expanded user messages, in a computer system having a logging tool for creating a log file comprising log messages in response to events occurring during execution of an application program, said method comprising the steps of pre-analysing the application program source code to extract a plurality of types of program component including comments, creating a plurality of relationship tables between said different component types, reading an individual log message from said log file, determining said program components in said log message, reading comments associated with said program components from said relationship tables and combining said comments to produce said expanded user messages.

In other aspects, the present invention provides a system and computer program for generating expanded user messages in accordance with this method.

Specifically, the diagnostic process is improved since the existing comments present in the program source code, header files or message catalogs are used to supplement the original messages from the log files. This provides the end user with more meaningful information and may allow users to perform a greater proportion of problem determination, with a decreased amount of assistance from the service organisation responsible for the application or operating system code itself. The advantages are a reduced workload for service personnel and less time-consuming problem determination, since a detailed analysis of the program source code by the end user is not required.

In a further preferred aspect of the present invention, the program components described comprise functions, variables, conditions and comments. Preferably, pre-analysis of the program source code to create the plurality of relationship tables, includes textual parsing. Preferably, the comments obtained are parsed to form natural language text, which is easier for the end user to understand, hence, more rapid problem determination can occur. To obtain the full benefit of the invention, the comments written in the program source code should be structured in a pre-determined manner. In another preferred aspect of the invention, a mouse driven pointer, positioned over the log messages can select said log messages. Alternatively, the selection of further messages could be automated to increase efficiency.

The relationship tables comprise a function-comment table, a variable-comment table, a condition-comment table and a function-variable table. The relationship tables are stored in binary form and are hashed to enable the expanded user messages to be generated at a greater speed. However, an alternative embodiment could achieve the generation through use of relationship tables stored in a flat text form. The lookup of program components is envisaged to occur using a form of index searching, which is a simple and efficient technique.

In many cases, a log message arises due to an earlier failure or problem within the system. If the log message did not occur immediately after said failure or problem, such that the two log messages were sequential within the log file, the inter-relationship between the two log messages may not be readily apparent. In an extension of the present invention, further log messages in a log file can also be analysed, in order to determine relationships with the individual log message. Further log messages are read from the log file and its program component types are determined. Any inter-relationships between the individual log message and the further log message are determined and this process is recursively repeated until no further log messages can be selected from the log file. The comments associated with all the inter-related program components, derived from the plurality of relationship tables are sorted by order of execution. These comments are combined to produce expanded user messages.

With reference to determining inter-relationships, program components of the individual log message are determined by linking the log message to an identifiable function and set of variables. The program components of the individual log message are then compared recursively to a relationship table to extract all inter-related program components, until no further inter-relationships exist. The iterative process results in a set containing the original program component of the individual log message and the derived program component(s) from the individual log message. The program components are stored in sets by type.

The inter-relationship determination process occurs when a further log message is read. Once its program components have been determined, these are compared to those in the sets derived from the individual log message. An inter-relationship between said individual and said further log messages is established when there is an intersection between program components in the further log message and all the program component sets derived from the individual log message. An indication that an inter-relationship has been derived is displayed to the end user.

The extended invention is advantageous in that it allows multiple relationships to be displayed to the end user, therefore assisting in determining the cause and resolution for a given problem.

BRIEF DESCRIPTION OF THE DRAWINGS

The present invention will now be described, by way of example only, with reference to preferred embodiments thereof as illustrated in the following drawings.

DETAILED DESCRIPTION OF THE PREFERRED EMBODIMENT

Figure 1:
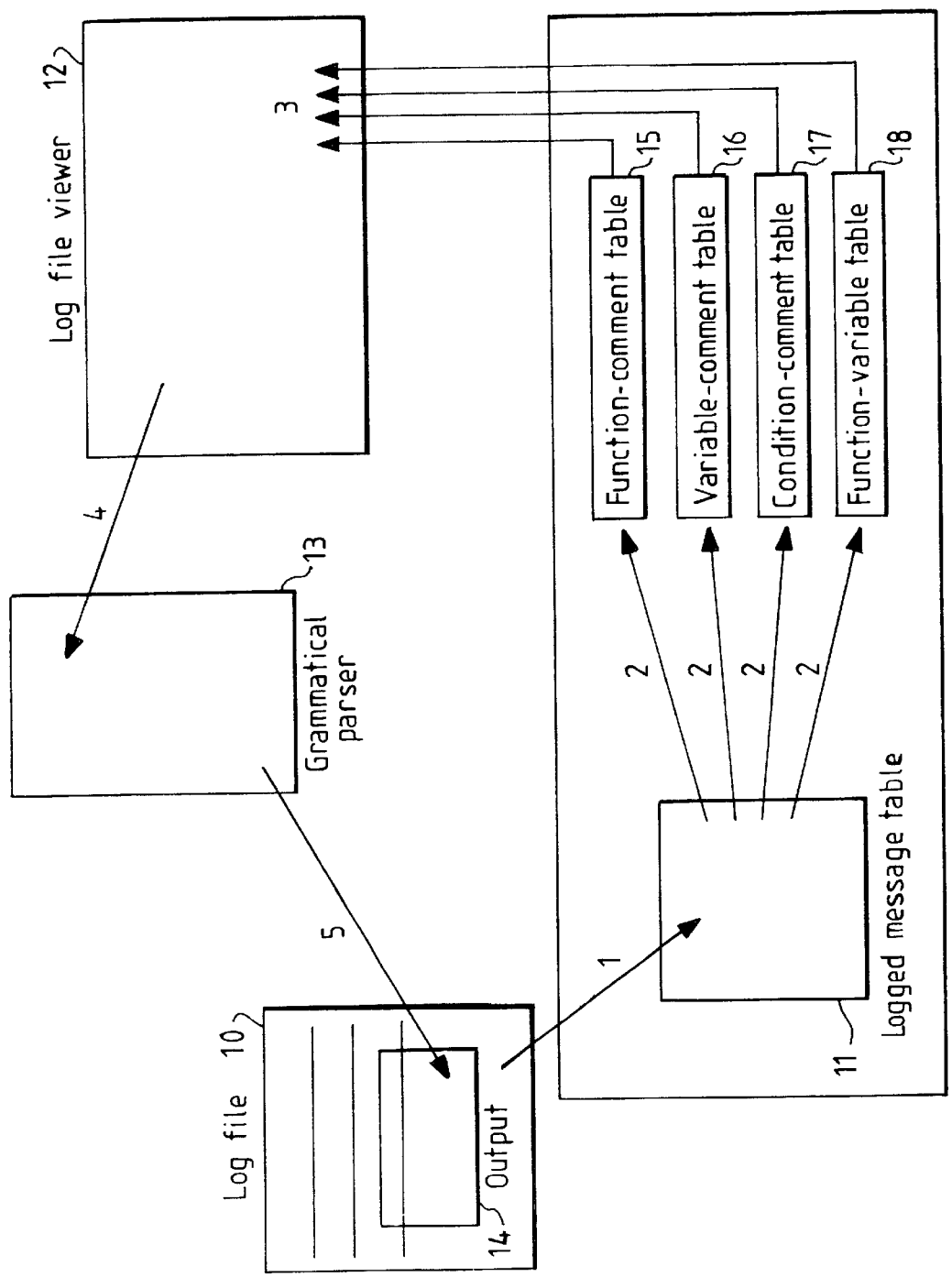
FIG. 1 is a block diagram of a computer system for generating expanded user messages, according to the present invention.

For a more complete understanding of the present invention, attention is directed to FIG. 1, in which the principal data structures and functional components of a computer system in which the invention is implemented are shown. Arrowed lines (1,2,3,4,5) illustrate the flow of data between components. In overview, log file viewer (12) permits selection of log message(s) in a log file (10). Comments are retrieved from a plurality of tables (15–18) corresponding to the program components of the selected log message(s) and are refined into a natural language output by a grammatical parser (13).

Firstly, a log message in log file (10) is selected, wherein the log message is in the format of full text. The message_identifier of the log message, in the message catalog is looked up in the logged message table (11). This determines the program components in said log message, such as functions and variables. Additionally, further inter-related program components can be determined and the associated comments read from other relationship tables.

Figure 2:
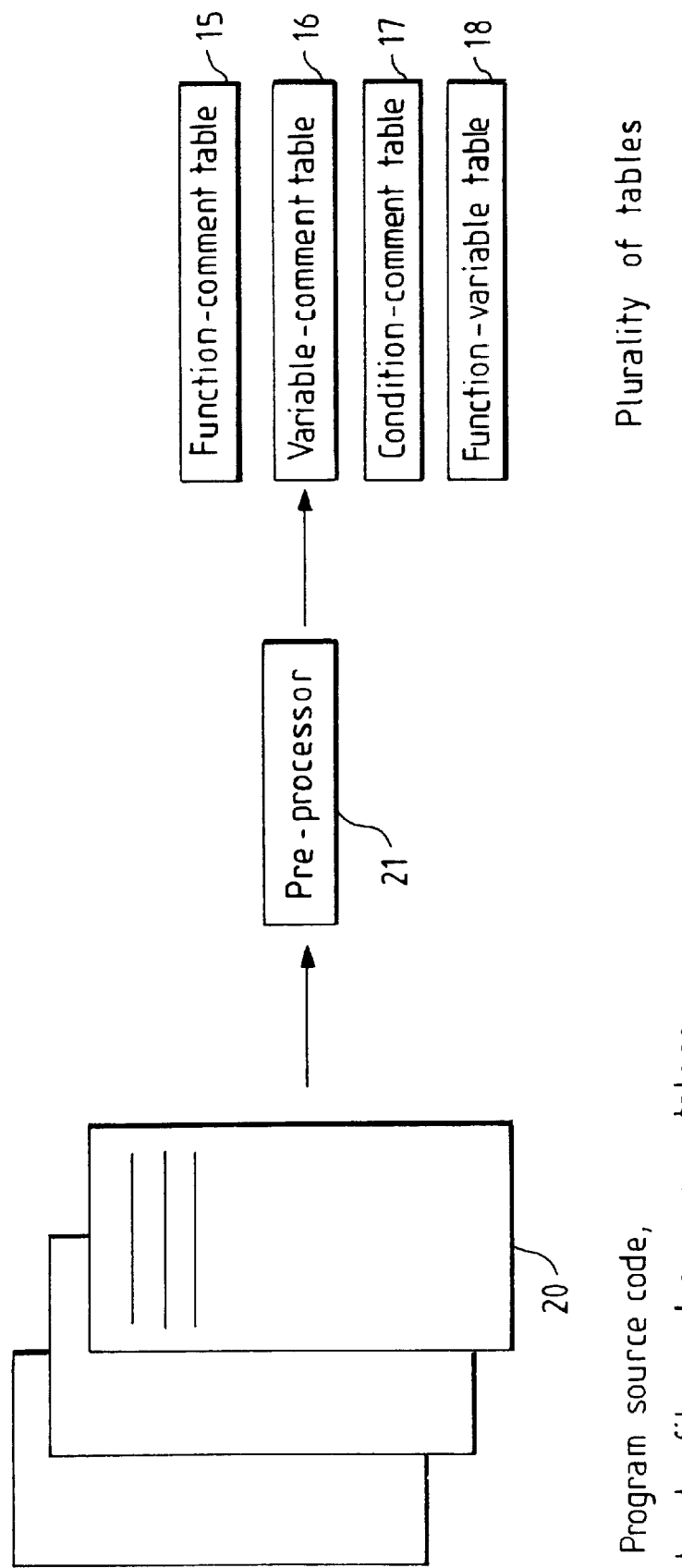
FIG. 2 shows in block diagram form, the operation of a pre-processor, to provide tables employed in the system of FIG. 1.

These tables are generated by, a pre-processor (21), as shown in block diagram form in FIG. 2. The operation of pre-processor (21) is to extract information from the program source code, header files or message catalogs (20) and order this information into tabular form. The information extracted comprises of:

i) existing comments from the program source code, header files or message catalogs ii) log calls which link a log message_identifier to a function or set of variables iii) variable to function relationships;

The program source code files, header files and message catalogs (20) contain comments which conform to a pre-determined set of guidelines to promote usability in the comment text and allow easier manipulation by the log file viewer (12) for the purpose of creating natural language outputs. These guidelines should not require significant additional effort by developers as most comments are typically written in natural language. The guidelines will aid with inter-relationship determination, in that, rather than keeping comments short or abbreviated, the comments will contain more information and references to program components directly.

For example, the comment below would not be very useful to the present invention, as it does not contain enough detail:

```
/* This bit is where stuff happens */
```

However, the comment below would be more useful to both future developers and could also be used by the log file viewer (12):

```
/* The do_stuff function takes text_input, modifies it
   according to the predefined guidelines and puts the */
/*modified text in text_output */
```

Further guidelines would ensure that adjacent comment lines are regarded as being part of the same comment rather than separate comments. For example, the comment below would be treated as a single comment:

```
// This is the complete text
// of the comment.
```

However, the following comments would be treated as two separate comments:

```
// This is the complete text of the comment
// This is the complete text of a different comment
```

Once the pre-processor (21) has extracted information from the program source code, header files or message catalogs (20), these items are stored in a plurality of tables (15–18), which facilitate easy lookup of the items, namely:

i) a function-comment (15) table, which stores comments containing descriptive text about the role that is played by each function within the program source code, header files or message catalogs (20).

ii) a variable-comment table (16) which stores descriptive text about the role that is played by each variable within the program source code, header files or message catalogs (20).

iii) a condition-comment (17) table comprises comments describing the condition(s), which give rise to the log message in the logged message table (11). The table (17) stores the inter-relationships linking the condition to the description of the condition.

Extracting comments from the above tables (15–17) may expose other functions or variables, exemplified by lookup of function-function or variable-variable interactions in the function-variable table (18).

Referring once again to FIG. 1, thirdly, the resultant set of comments is combined by the log file viewer (12), to derive an expanded user message(s) linking the log messages together. These expanded user messages may then be further grammatically parsed by a parser (13) to produce natural language output which is displayed to the end user in either a window or a pop up menu (14).

Figure 3:
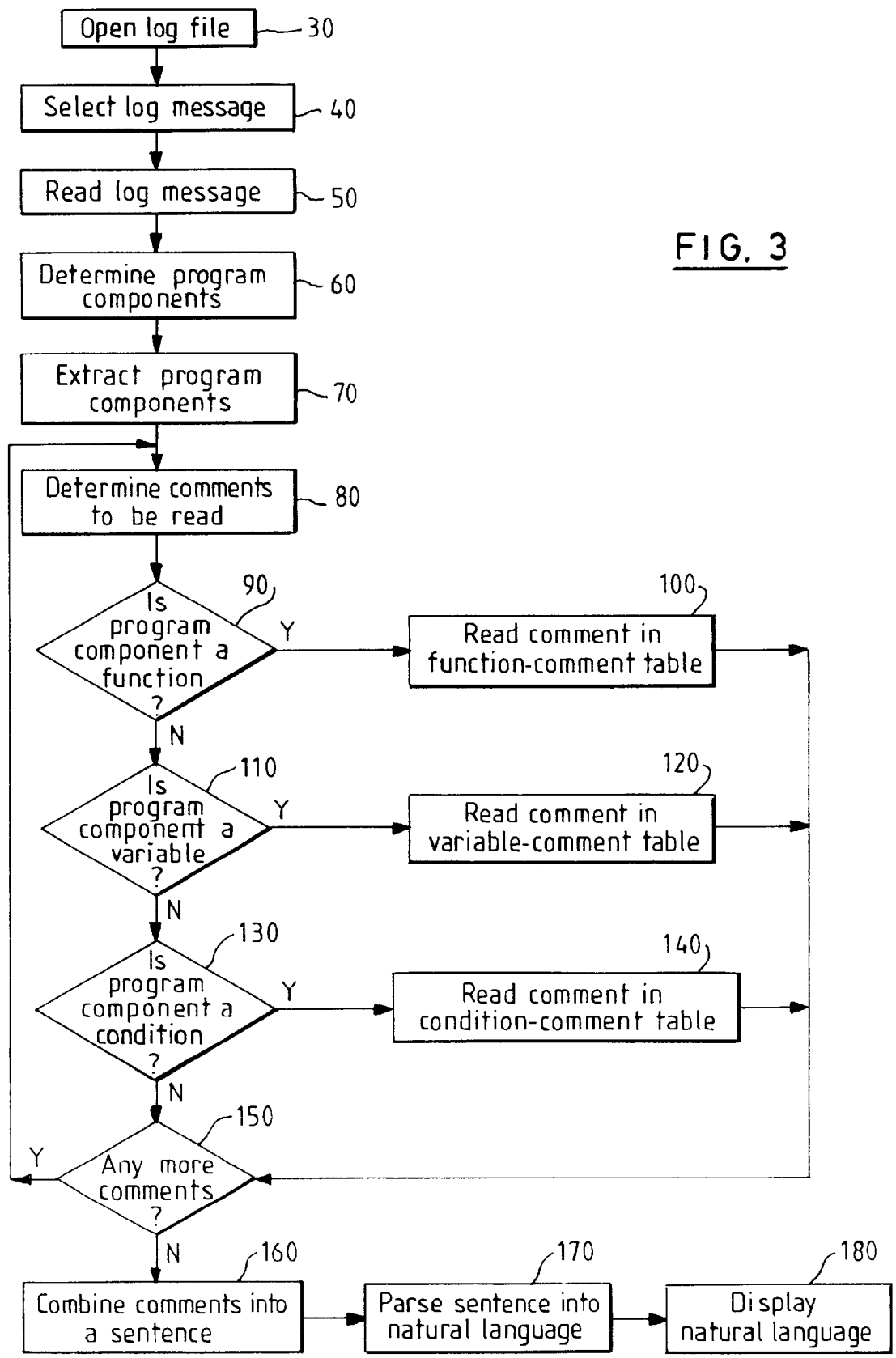
FIG. 3 is a flow diagram illustrating a method generating user messages for an individual log message from a log file.

FIG. 3 illustrates in flow diagram form, the process of interpreting and displaying an individual log message from a log file (10) according to a preferred embodiment of the present invention.

The viewer opens (30) the log file (10), an individual log message is selected (40) by a mouse-driven pointer and is read (50) by the log file viewer (12) from the logged message table (11). The table (11) contains the logging function and its associated parameters. Thus by using the log entry in the table (11), it is possible to link the log message written to the log file (10) to an identifiable function and sets of variables or conditions. Once the program components from the log message have been determined (60) and extracted (70), the comments associated with them are determined (80) from the plurality of relationship tables (15–18). Extracting comments from the relationship tables (15–18) may expose other functions or variables, exemplified by lookup of function-function or variable-variable interactions in the function-variable table (18).

Comments are read recursively until all outstanding reference to functions, variables and conditions have been resolved. For example, if the program component is determined (90) to be a function, the associated comments are read (100) from the function-comment table (15). This process is repeated for variables and conditions, in steps (110), (120), (130) and (140). If there are still more comments to be read (positive result to step (150)), these are determined (80), otherwise (negative result to step (150)), the resultant set of comments is combined (160) to derive an expanded user message(s) linking the log messages together. The expanded user message(s) may then be further grammatically parsed (170) to produce natural language output, which is displayed (180) to the end user.

As an example, consider a log message written to a log file (10) arising from the example code fragment in Appendix A:

```
DISK_ERROR_6: connected_where, hdisk3, scsi0, -1, NULL
```

The logged message table (11) contains the logging function of the log message above and its associated parameters, as described previously:

```
log_error (LOGMSG2, connected_where, diskname,
   disk-adapter, rc, NULL);
```

DISK_ERROR_6 is an identifier that points to a message catalog (20). The message catalog (20) is a mechanism for separating program code from messages, which allows the messages to be translated into another language without requiring the program code to be edited. The corresponding message catalog entry, by way of example, is:
DISK_ERROR_6 "function %s failed with params %s,%s, %s. Status is %s"

When the log_error function is run, the message catalog entry "function %s failed with params %s,%s, %s. Status is %s" is written to the log file (10). The values of the variables, such as scsi0, are inserted at the respective %s locations. When the entry "function %s failed with params %s,%s, %s. Status is %s" is found in the log file (10), the log file viewer (12) searches the message catalog (20) on the system for this entry. This will link the entry "function %s failed with params %s,%s, %s. Status is %s" to the identifier.

Thus, a relationship can be determined between the entry in the log file and the program components of the original log message, by looking up DISK_ERROR_6 in the logged message table (11). In this example, looking through the message catalog would find DISK_ERROR_6, which would then refer back to the specific log_error function.

Examples of the plurality of relationship tables (15–18) are shown in Appendix B.

Text associated with the condition log_error (LOGMSG2, connected_where, diskname, disk-adapter, rc, NULL); is read from the condition-comment table (17) and the following sentence is derived:

```
Adapter disk_adapter does not exist in this system
```

Comments associated with the variables giving rise to the log message are extracted from the variable-comment table (16), which returns the following information:

```
diskname identifies the name of the disk device
rc is the return code from a function
```

In addition to the above variables, the text taken from the condition-comment table (17) contains a variable name, disk_adapter. This is subsequently extracted from the variable-comment table (16) and returns the following information:

---
disk_adapter identifies the name of the adapter to which disks are attached

---

Comments associated with the function of the log message are extracted from the function-comment table (15), which gives the following information:
The function connected_where identifies the location of the disk in the system
Lookup in the function-variable table (18) shows that connected_where calls the log_error and parent_device functions. The function parent_device in turn calls the syscfg function. Thus it is known, that there is a relationship between the connected_where function and the syscfg function, which generates the disk_adapter variable:

---
disk_adapter = parent_device. (diskname);

---

Lookup returns:

---
diskname is physically connected to the adapter, disk_adapter

---

Similarly parent_device, is looked up in the relationship tables (15–18), returning the information below:

---
parent_device searches the configuration database for the device
parent is the device in the configuration database where diskname is connected

---

Since no further functions, variables or conditions exist, the iteration completes and the following set of expanded user messages is provided:

---
Adapter disk_adapter does not exist in this system
diskname identifies the name of the disk device
rc is the return code from a function
disk_adapter identifies the name of the adapter to which disks are attached
The function connected_where identifies the location of the disk in the system
diskname is physically connected to the adapter, disk_adapter
parent_device searches the configuration database for the device
parent is the device in the configuration database where diskname is connected

---

Additionally, the name of the disk, hdisk3 and the adapter scsi0 are known from the log message. There is much redundancy in the above user messages, therefore after combining these expanded user messages and parsing them with the grammatical parser (13), output similar to the following is displayed to the end user in a window or pop up menu (14):

---
The adapter device scsi0 in the configuration database to which hdisk3 is supposed to be connected does not exist in this system

---

Figure 4:
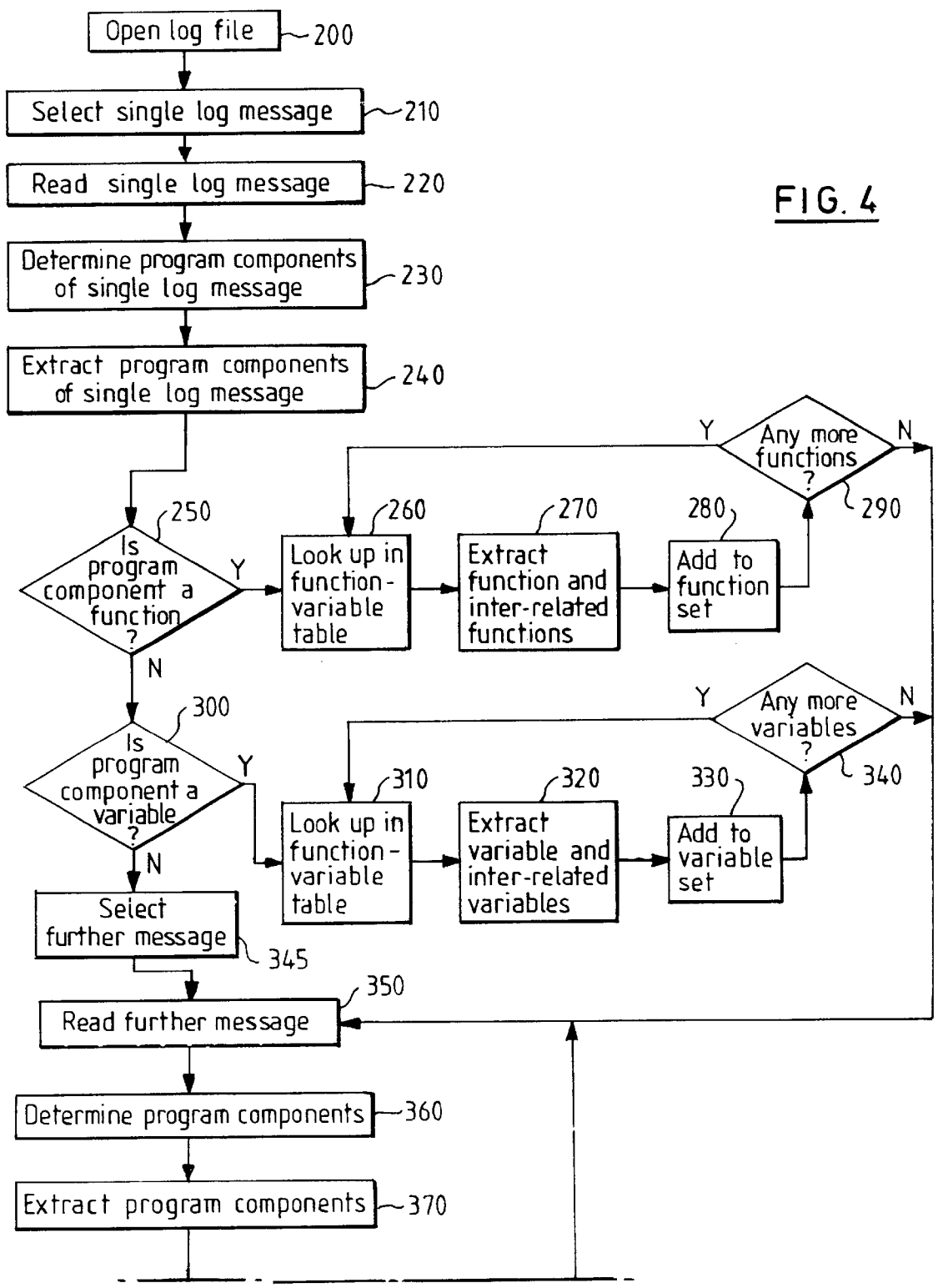
FIG. 4 is a flow diagram illustrating an extension of the method of FIG. 3, to further log messages.
Figure 4:
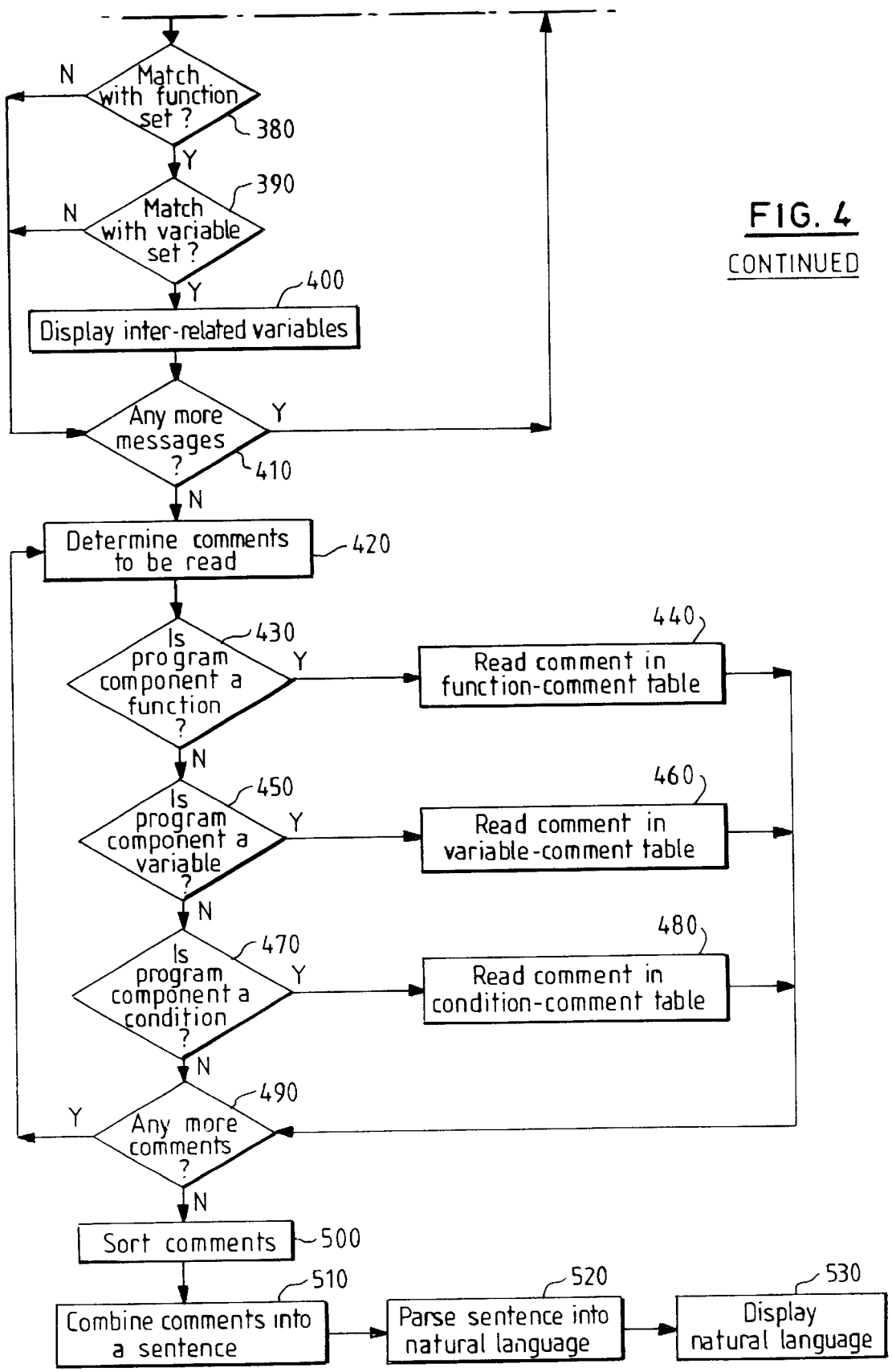

FIG. 4 illustrates in flow diagram form, the process of interpreting and displaying further log messages from a log file (10) according to an alternative embodiment of the present invention.

The viewer opens (200) the log file (10) and a mouse-driven pointer selects (210) the individual log message which is read (220). Lookup of the individual log message in the logged message table (11) provides the lines of code that generated the original log message and the entries in the table (11) also show (230) the function, variables and conditions in use.

In order to extract (240) the program components in use, a list of other related program components need to be determined. For example for a function (250), a recursive extraction is performed by look up (260) in the function-variable table to extract (270) a set of unique functions that bear some relationship to each other. The original function and the derived functions are added (280) to a function set. This process is repeated for each extracted function in turn until all inter-related functions are extracted (290). A similar extraction process is also applied to variables and the resulting sets may now be used to identify inter-relationships between the individual log message and any subsequently selected one, as illustrated in steps (300) to (340).

The mouse-driven pointer is subsequently held down and dragged in order to select (345) further log messages above or below said individual log message. A further log message is read (350), and lookup of the further log message occurs in the logged message table (11), which will provide the lines of code that generated the original log message. Additionally, the entries in the table (11) also determine (360) the functions, variables and conditions in use when each log message was written to the log file (10). The program components are extracted (370) from the tables and are compared (380, 390) to the sets of functions and variables derived from the individual log message, to determine whether a common linkage is shared, either through use of functions or variables.

An inter-relationship is established under the following conditions:
 i) there is an intersection (380) between the function in the further log message and the function set derived from the individual log message and;
 ii) there is an intersection (390) between the variable(s) in the further log message and the variable set(s) derived from the individual log message.

Only if the above two conditions are both satisfied, is an inter-relationship said to exist between the individual log message and that which the pointer has subsequently selected. An indication that an inter-relationship has been derived is displayed (400) to the end user such as, with a colour change of the log messages or enabling the text of the log messages to be displayed in a larger font. If the above two conditions are not satisfied, an inter-relationship does not exist between log messages.

The following step checks (410) whether further log messages in the log file are present and if so, these are read (350) and the process repeats itself. If the log file (10) does not contain further log messages, the recursive process completes.

Once a relationship between two or more log messages is established, the comments associated with these are determined (420) from various relationship tables. For function, variable or condition program components (steps 430, 450, 470) the function-comment table, the variable-comment table and the condition-comment table are read respectively, in steps (440), (460) and (480). If there are any more comments to be read, as determined in step (490), these are determined (420) until all comments have been extracted. Otherwise, the comments are sorted (500) by order of execution and the resultant set of comments is combined to derive an expanded user message(s) linking the log messages together (510). The expanded user message(s) may then be further grammatically parsed (520) to produce natural language output, which is displayed to the end user (530).

As an example, consider selecting two log messages written to a log file (10) arising from the example code fragment in Appendix A:

```
DISK_OPERATION_ERROR: open_disk - hdisk3, 255, NULL
DISK_ERROR_6: connected_where - hdisk3, scsi0, -1, NULL
```

The logged message table (11) contains the logging function of the log messages above and the associated parameters, as described previously:

```
log_error (LOGMSG4, open_disk, diskname, rc, NULL
log_error (LOGMSG2, connected_where, diskname,
disk-adapter, rc, NULL);
```

As previously described, looking up DISK_ERROR_6 and DISK_OPERATION_ERROR in the logged message table (11), refers back to the specific log_error function. It is known that there is a relationship between the two log messages in that they share the same variable, diskname.

Comparison of the function and variables in the further log message against the function and variable sets of the individual log message could similarly determine more complex inter-relationships. With reference to the individual log message, log_error (LOGMSG4, open_disk, diskname, rc, NULL); was generated by the function open_disk, when it was run using with the variables diskname and rc. By lookup in the function-variable table (18) it is known that the open_disk function has some relationship to the functions activate_disk ( ) and open ( ). For each of these extracted functions, similar relationships may be derived. For example, activate_disk has relationships to the functions disk_type( ), connected_where( ) and open_adapter( ). This recursive process is repeated for each extracted function in turn until all inter-related functions are extracted and no further inter-relationships exist. This gives a set of unique functions that have some relationship to the open_disk function.

Similar recursive extraction is performed on the function-variable table (18) to extract inter-relationships to the variables, diskname and rc. For each variable, this results in a set of unique variables that bear some relationship to each other. These function and variable sets may now be used to identify inter-relationships between the individual log message and any subsequently selected one.

Each further log message in the log file (10) is read as the mouse-driven pointer selects it and the corresponding line of program code is identified by lookup in the logged message table (11). From this, the program components may be identified as before and are compared against those in the sets derived from the individual log message. If there is both an intersection between the function in the individual log message and the function set and the variable(s) in the individual log message and the variable set(s), then an inter-relationship exists between the individual log message and the further log message. If no intersection is derived or there exists solely an intersection between either functions or variables, a relationship between the log messages does not exist and no additional processing is performed.

Examples of the relationship tables (15–18) are shown in Appendix B.

Comment text for the two log messages is read from the condition-comment table (17):

```
Attempt to open diskname failed
Adapter disk_adapter does not exist in this system
```

Comments associated with the variables giving rise to the log message are extracted from the variable-comment table (16):

```
diskname identifies the name of the disk device
rc is the return code from a function
```

In addition to the above variables, the comment text taken from the condition-comment table (17) contains a variable name, disk_adapter. This is also extracted from the variable-comment table (16):

```
disk_adapter identifies the name of the adapter to which
disks are attached
```

Comments associated with the functions giving rise to the log messages are extracted:

```
The function connected_where identifies the location of
the disk in the system
open_disk attempts to establish a path to the disk
identified by diskname
open_disk makes the disk, diskname, active
```

As previously described, connected_where generates the disk_adapter variable. Lookup returns:

```
diskname is physically connected to the adapter,
disk_adapter
```

Similarly parent_device, is looked up in the relationship tables (15–18), returning the information below:

```
parent_device searches the configuration database for the
device
parent is the device in the configuration database where
diskname is connected
```

Since no further functions, variables or conditions exist, the iteration completes and the following set of expanded user messages is provided:

```
Attempt to open diskname failed
Adapter disk_adapter does not exist in this system
diskname identifies the name of the disk device
rc is the return code from a function
disk_adapter identifies the name of the adapter to which
disks are attached
The function connected_where identifies the location of
the disk in the system
open_disk attempts to establish a path to the disk
identified by diskname
open_disk makes the disk, diskname, active
diskname is physically connected to the adapter,
disk_adapter
parent_device searches the configuration database for the
device
parent is the device in the configuration database where
diskname is connected
```

Additionally, the name of the disk, hdisk3 is known from the log message. There is much redundancy in the above user messages, therefore after combining these user messages and parsing them with the grammatical parser (13), output similar to the following is.displayed to the end user in a window or pop up menu (14):

```
The attempt to establish a path to the disk, hdisk3
failed with the return code of 255 because the adapter to
which disk hdisk3 is supposed to be physically connected
to, according to the configuration database, does not
exist in this system.
```

The use of the present invention offers many advantages. For example, since the log messages displayed to the end user are all derived from functions, variables and conditions within the program source code, header files or message catalogs, accurate information is provided. An extension of the present invention allows interpretation of further log messages, which is invaluable to end-users. By allowing analysis of further log messages, dependencies can be determined between log messages, which may assist with the debugging of more complex errors.

Furthermore, since the process of determining inter-relationships is finite as it is based upon a set number of tables, the search is not exhaustive such as in data mining tools. This allows the process of determining inter-relationships to be much quicker, resulting in a more rapid display of possible cause and solution to the end user. Additionally, in accordance with one aspect of the invention, the display to the end user of log messages occurs in natural language which may aid in increasing the level of understanding which the end user has of the events and may even increase the proportion of self-diagnosis. Since a greater amount of the analysis process can be shifted to the end user, this may even allow resources in the technical support areas to be freed up more quickly.

Given that many applications primarily use standard header files, once these have been structured to allow comments to be written according to defined guidelines, they become immediately useful to all subsequent applications which make use of the guidelines. The additional effort required in enabling a new application for use with the present invention is little more than that which is required in writing the application initially. Furthermore, modifying existing applications is simply a matter of creating comments and running the program source code through the pre-processor to generate the plurality of relationship tables.

A further advantage of the present invention is concerned with the aspect of keeping all program-specific content in the plurality of relationship tables, hence enabling the log file viewer to be a generic tool. This allows the present invention to support multiple applications and additionally, by ensuring that a pre-processor generates relationship tables to a consistent format, the log file viewer is capable of supporting applications written in different or multiple programming languages.

APPENDIX A

Example program source code

```
char diskname;       // diskname identifies the name of the disk device
int rc;              // rc is the return code from a function
char disk_adapter;   // disk_adapter identifies the
                     name of the adapter to which disks are attached
char disktype;       // disktype is the sort of disk, it's connection type
// The function, activate_disk, puts a disk into a state where the operating
system can use it.
function activate_disk(diskname)
{
    //open_disk makes the disk, diskname, active
    open_disk (diskname);
    if(rc != 0)
    {
        // Open failed at first attempt, check connections
        log_error(LOGMSG1,activate_disk,
        diskname, rc, 1ST_ATTEMPT);
        disktype = disk_type(diskname);
        switch(disktype)
        {
            case SCSI:
                // Disk, disk_name is a SCSI attached disk.
                adapter_type=scsi;
                break
            case SERIAL:
                // Disk, disk_name is an SSA attached disk.
                adapter_type=ssa;
                break;
            case USB:
                // Disk, disk_name is a USB attached disk.
                adapter_type=usb;
                break;
        }
        // disk_adapter identifies where diskname
        is physically connected in the system.
        disk_adapter = connected_where(diskname);
        //open_adapter makes the disk attachment adapter,
        disk_adapter, active
        open_adapter(adapter_type, disk_adapter);
        //open_disk makes the disk, diskname, active
        open_disk (diskname);
    }
}
// The function connected_where identifies the location
of the disk in the system.
function connected_where (diskname)
{
    //diskname is physically connected to the adapter, disk_adapter
    disk_adapter = parent_device (diskname);
    if (rc != 0)
    {
        // Adapter disk_adapter does not exist in this system
        log_error (LOGMSG2; connected_where, diskname,
        disk_adapter, rc, NULL);
        exit −1;
    }
```

APPENDIX A-continued

Example program source code

```
    return disk_adapter;
}
//_The function open_adapter is used to attempt to establish a path
to the disk adapter identified by disk_adapter.
function open_adapter(adapter_type, disk_adapter)
{
    // Different disk adapters are opened in different ways,
    based on adapter_type
    switch(adapter_type)
    {
      case scsi:
        options = "SCSI, OPEN, RESERVE";
        break
      case ssa:
        options = "SSAOPEN";
        break;
      case usb:
        options = "USB, OPEN, READWRITE;
        break;
      case ssa:
        options = "SSAOPEN";
        break;
    }
    rc = open(disk_adapter, options);
    if(rc != 0)
    {
        // Attempt to open adapter disk_adapter, failed
        log_error (LOGMSG3, open_adapter,
        disk_adapter, rc, options);
        exit −1;
    }
    // Adapter, disk_adapter opened successfully
    return 0;
}
//open_disk attempts to establish a path to the disk identified by diskname
function open_disk(diskname)
{
    // Different disk adapters are opened in different ways,
    based on adapter_type
    rc = open(diskname, ACTIVE | READWRITE);
    if (rc != 0)
    {
        // Attempt to open diskname failed
        log_error (LOGMSG4, open_disk, diskname, rc, NULL);
        exit −1;
    }
    // Disk, diskname opened successfully
    return 0;
}
// parent_device searches the configuration database for the device
function parent_device (diskname)
{
    // parent is the device in the configuration database
    where diskname is connected
    parent = syscfg(parent, diskname);
    return (parent);
}
```

APPENDIX B

Relationship tables

Each relationship table is illustrated with an illustration based upon the example program source code in Appendix A.

Note that the relationship tables represented here are in a textual form. In a practical application of the present invention, the relationship tables would typically be stored in a binary format and hashed to permit faster searching by the log file viewer. For the purposes of this discussion and to ensure clarity; the textual examples will be used.

Function-Variable Table

The inter-relationship between the different variables and functions is held in this table. Given the example program source code in appendix A, a table comprising of the data such as that detailed below, would be derived:

```
function activate_disk(diskname)
    open_disk (diskname);
    log_error (LOGMSG1, activate_disk, diskname, rc,
    1ST_ATTEMPT);
    disk_type(diskname);
    connected_where(diskname);
    open_adapter(adapter_type, disk_adapter);
    open_disk (diskname);
function connected_where (diskname)
    parent_device (diskname);
    log_error (LOGMSG2, connected_where, diskname, disk_adapter,
    rc, NULL);
function open_adapter(adapter_type, disk_adapter)
    open(disk_adapter, options);
    log_error (LOGMSG3, open_adapter, disk_adapter, rc, options);
function open_disk(diskname)
    open(diskname, ACTIVE|READWRITE);
    log_error (LOGMSG4, open_disk, diskname, rc, NULL);
function parent_device (diskname)
    parent = syscfg(parent, diskname);
```

Logged Message Table

Each line of source code where a message is logged and hence written to a log file, is held in the logged message table. This contains the logging function and it's associated parameters. The table contents will look like this:

```
    log_error(LOGMSG1, activate_disk, diskname, rc,
    1ST_ATTEMPT);
    log_error (LOGMSG2, connected_where, diskname, disk_adapter,
    rc, NULL);
    log_error (LOGMSG3, open_adapter, disk_adapter, rc, options);
    log_error (LOGMSG4, open_disk, diskname, rc, NULL);
```

Condition-Comment Table

From the example code, this table would look like:
log_error(LOGMSG1, activate_disk, diskname, rc, 1ST_ATTEMPT) Open failed at first attempt, check connections
log_error (LOGMSG2, connected_where, diskname, disk_adapter, rc, NULL) Adapter disk_adapter does not exist in this system
log_error (LOGMSG3, open_adapter, disk_adapter, rc, options) Attempt to open adapter disk_adapter, failed
log_error (LOGMSG4, open_disk, diskname, rc, NULL) Attempt to open diskname failed Function-Comment Table From the example code, this table would look like:

| | |
|---|---|
| activate_disk | The function, activate_disk, puts a disk into a state where the operating system can use it |
| connected_where | The function connected_where identifies the location of the disk in the system |
| open_adapter | The function open_adapter is used to attempt to establish a path to the disk adapter identified by disk_adapter |
| open_disk | open_disk attempts to establish a path to the disk identified by diskname |
| parent_device | parent_device searches the configuration database for the device |

Variable-Comment Table

When variables are initially declared, there should be a comment associated with the variable. From the example code, this table would look like:

| | |
|---|---|
| diskname; | diskname identifies the name of the disk device |
| rc; | rc is the return code from a function |
| disk_adapter; | disk_adapter identifies the name of the adapter to which disks are attached |
| disktype; | disktype is the sort of disk, it's connection type |

I claim:

1. In a computer system having a processor, a memory, an operating system capable of executing application programs, and a logging tool for creating a log file comprising log messages in response to events occurring during execution of said application programs, a method for dynamically generating expanded user messages, comprising the steps of:

pre-analysing the application program source code to extract a plurality of types of program component including comments, creating a plurality of relationship tables between said different component types, reading an individual log message from said log file, determining said program components in said log message, reading comments associated with said program components from said plurality of relationship tables, combining said comments to produce said expanded user messages.

2. A method as claimed in claim 1, in which said program components comprise functions, variables, conditions and comments.

3. A method as claimed in claim 1, comprising the steps of parsing said comments to form natural language text and displaying said natural language text in a window or pop up menu.

4. A method as claimed in claim 1, in which said pre-analysis step includes textual parsing.

5. A method as claimed in claim 4, in which said comments are written into program source code, header files and message catalogs and the formats of said comments are structured in a pre-determined manner.

6. A method as claimed in claim 1, in which said log messages are selected by a mouse driven pointer, positioned over said log messages.

7. A method as claimed in claim 1, in which said plurality of relationship tables, comprise a function—variable table, a condition—comment table, a function—comment table and a variable—comment table.

8. A method as claimed in claim 1, in which said individual log message can be compared for inter-relationships with further log messages, comprising the steps of:

reading a further log message from said log file, extracting program component types from said further log message, determining any inter-relationships between said two log messages, recursively repeating inter-relationship determination between said individual log message and said further messages, until no further log messages can be selected from said log file, reading comments associated with all said inter-related program components from said plurality of relationship tables and sorting said comments by order of execution, combining said comments to produce said expanded user messages.

9. A method as claimed in claim 8, wherein further program components inter-related to said program components from said individual log message, are extracted recursively from said plurality of relationship tables until all inter-related program components are extracted.

10. A method as claimed in claim 8 wherein said program components and said inter-related program components are stored in sets by type.

11. A method as claimed in claim 10, in which said extracted program component types of said further log message are compared to said program component types of said sets and wherein a successful inter-relationship between said further log messages and said individual log message occurs with an intersection between all said program component sets.

12. A method as claimed in claim 8, wherein said successful inter-relationship is displayed.

13. A system for dynamically generating expanded user messages, including a processor, memory, and operating system capable of executing application programs, said system comprising:

a tool for generating log messages in response to events from the execution of said application program, a pre-processor for pre-analysing the application program source code to extract a plurality of types of program component including comments and creating a plurality of relationship tables between said different component types, means for reading an individual log message from said log file, means for determining said program components in said log message, means for extracting comments associated with said program components from said plurality of relationship tables, and means for combining said comments to produce said expanded user messages.

14. A computer program recorded on a medium, said program for dynamically generating expanded user messages in a computer system having a processor, a memory, an operating system capable of executing application programs, and a logging tool for creating a log file comprising log messages in response to events occurring during execution of said application programs, said computer program comprising:

means for pre-analysing the application program source code to extract a plurality of types of program component including comments, means for creating a plurality of relationship tables between said different component types, means for reading an individual log message from said log file, means for determining said program components in said log message, means for extracting comments associated with said program components from said plurality of relationship tables, means for combining said comments to produce said expanded user messages.

* * * * *